(12) United States Patent
Yoshimoto (10) Patent No.: US 11,148,625 B2
(45) Date of Patent: Oct. 19, 2021

(54) VEHICLE FRONT STRUCTURE

(71) Applicant: TOYOTA JIDOSHA KABUSHIKI KAISHA, Aichi-ken (JP)

(72) Inventor: Masaki Yoshimoto, Seto (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 0 days.

(21) Appl. No.: 16/695,193

(22) Filed: Nov. 26, 2019

(65) Prior Publication Data

US 2020/0164822 A1    May 28, 2020

(30) Foreign Application Priority Data

Nov. 27, 2018    (JP) .............................. JP2018-221646

(51) Int. Cl.
*B60R 19/52*      (2006.01)
*B62D 25/08*     (2006.01)
*B60R 19/02*     (2006.01)

(52) U.S. Cl.
CPC ............ *B60R 19/52* (2013.01); *B62D 25/084* (2013.01); *B60R 19/02* (2013.01); *B60R 2019/527* (2013.01)

(58) Field of Classification Search
CPC .... B60R 2019/1886; B60R 2021/0053; B60R 2021/0051; B60R 19/52; B60R 2019/527; B60R 2019/525; B62D 25/84

USPC ......................................... 296/187.04, 193.1
See application file for complete search history.

(56) References Cited

U.S. PATENT DOCUMENTS

| | | | |
|---|---|---|---|
| 10,160,418 B2 * | 12/2018 | Onishi | .................. B60R 19/023 |
| 2001/0026072 A1 | 10/2001 | Sato et al. | |
| 2008/0001433 A1 * | 1/2008 | Noyori | ..................... B60R 19/12 296/187.04 |
| 2013/0180789 A1 * | 7/2013 | Maurer | .................. B60K 11/08 180/68.1 |
| 2017/0129430 A1 * | 5/2017 | Aizawa | .................... B60R 19/52 |
| 2018/0345880 A1 * | 12/2018 | Yoshimoto | .............. B60R 5/044 |
| 2020/0094879 A1 * | 3/2020 | Tanabe | .................... B60R 19/18 |

FOREIGN PATENT DOCUMENTS

| | | |
|---|---|---|
| DE | 102009030686 A1 | 1/2010 |
| JP | 2001-277964 A | 10/2001 |
| JP | 2017088082 A  * | 5/2017 ............. B60R 19/52 |
| WO | 9502525 A1 | 1/1995 |

* cited by examiner

*Primary Examiner* — Jason S Morrow
(74) *Attorney, Agent, or Firm* — Hauptman Ham, LLP (57) ABSTRACT

A vehicle front structure includes a grille stay located behind a bumper panel having a grille opening, and a stay cover disposed to cover a rear portion of the grille stay. The grill stay faces an upper portion of the bumper panel from behind. The grille stay includes a front portion and a rear portion, and the rear portion has a smaller cross sectional area than the front portion. The grill stay further includes a step portion at a boundary between the front portion and the rear portion. The stay cover includes a front end that is disposed to face a rear face of the step portion.

20 Claims, 7 Drawing Sheets

VEHICLE FRONT STRUCTURE

CROSS REFERENCE TO RELATED APPLICATION

This application claims priority to Japanese Patent Application No. 2018-221646 filed on Nov. 27, 2018, which is incorporated herein by reference in its entirety including the specification, claims, drawings, and abstract.

TECHNICAL FIELD

The present disclosure relates to a vehicle front structure including a grille stay disposed behind a bumper panel.

BACKGROUND

Patent Document 1 discloses a front bumper including an upper bumper portion and a lower bumper portion, and impact absorbing members disposed in the respective portions. The strength of the lower absorbing material disposed in the lower bumper portion against impact is greater than that of the upper absorbing member disposed in the upper bumper portion. When the vehicle front portion collides with a pedestrian, this structure allows the lower bumper part to strongly push the shin part of the pedestrian to scoop it up, thereby reducing the impact applied to the knee of the pedestrian.

CITATION LIST

Patent Literature

Patent Document 1: JP 2001-277964 A

Patent Document 1 assumes vehicles having an inclined front portion with a front end having a rather small height. However, some vehicles have a rather large front grille, and a front end with a greater height. When a vehicle with such a front end shape collides with a pedestrian, the load applied to the pedestrian's leg would differ from that applied by the assumed vehicle described above. Therefore, there is a demand that the load applied to the pedestrian's leg in collision should be appropriately varied in accordance with the shape of the vehicle.

SUMMARY

A vehicle front structure according to the disclosure includes a grille stay located behind a bumper panel having a grille opening, and a stay cover disposed to cover a rear portion of the grille stay. The grill stay faces an upper portion of the bumper panel from behind. In the vehicle front structure, the grille stay includes a front portion and a rear portion and the rear portion has a smaller cross sectional area than the front portion. The grill stay further includes a step portion at a boundary between the front portion and the rear portion. The stay cover includes a front end that is disposed to face a rear face of the step portion.

A radiator support may be disposed behind the bumper panel, and a duct upper wall may extend from an upper portion of the radiator support toward the bumper panel above the grille opening. The duct upper wall may have a front end facing an abutting surface extending rearward on a rear surface of the bumper panel.

The stay cover may be secured to the radiator support via a grille bracket, and the stay cover, the duct upper wall, and the grille bracket may be fastened and secured together.

The grille stay may have a box shape.

The vehicle front structure of the disclosure increases a resisting force against impact in the upper portion of the vehicle front face, thereby allowing an appropriate load to be applied to the pedestrian's leg in a collision.

BRIEF DESCRIPTION OF DRAWINGS

Embodiment(s) of the present disclosure will be described based on the following figures, wherein.

DESCRIPTION OF EMBODIMENTS

Embodiments of the present disclosure will be described by reference to the drawings. However, the disclosure is not limited to the embodiments described herein.

Entire Structure

Figure 1:
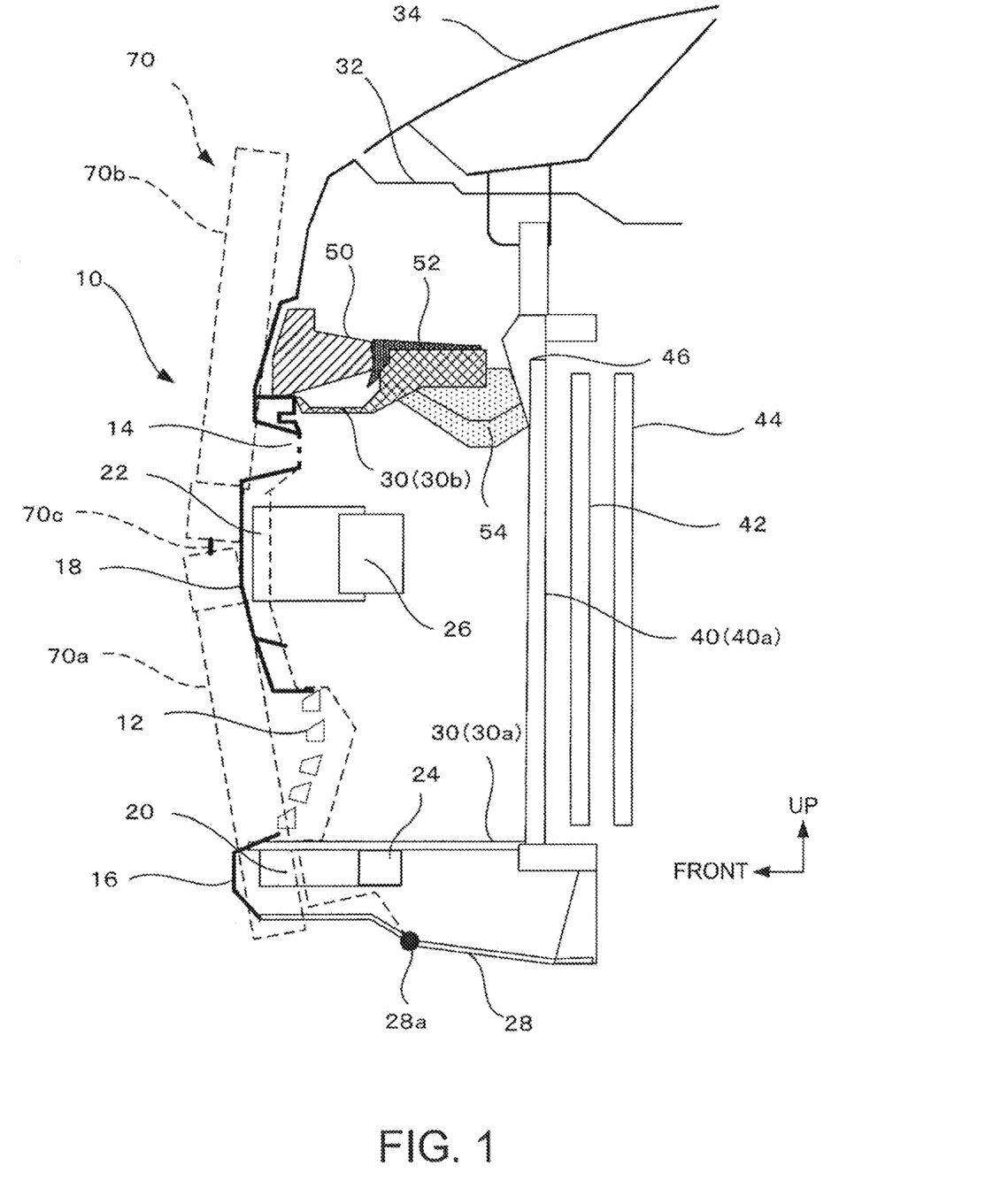
FIG. 1 illustrates a vehicle front structure.

FIG. 1 illustrates a vehicle front structure and shows principal elements in the embodiment.

The vehicle front structure includes a bumper panel 10 having an entirely rectangular shape and forming a front face of a vehicle. The bumper panel 10 includes a comparatively large lower grille opening 12 and a comparatively small upper grille opening 14, through which air enters a front space (engine compartment). The front vehicle structure further includes, below the lower grille opening 12, a lower bumper 16, and includes an upper bumper 18 between the lower grille opening 12 and the upper grille opening 14.

The vehicle front structure further includes, behind the lower bumper 16, a lower shock absorber 20 formed of an impact absorbing member, and a lower bumper reinforcement 24 behind the lower shock absorber 20. The lower bumper reinforcement 24 is a rectangular pipe-like frame member made of a steel member, for example, and extends along the vehicle width.

The vehicle front structure further includes, behind the upper bumper 18, an upper shock absorber 22 formed of an impact absorbing member, and includes, behind the upper shock absorber 22, an upper bumper reinforcement 26. The upper bumper reinforcement 26 is also a rectangular pipe-like frame member extending along the vehicle width.

A lower end of the lower bumper 16 is connected to a front end of an under cover 28. The under cover 28 extends rearward from the lower bumper 16 to cover the lower part of the front portion of the engine compartment.

Under the lower grille opening 12, a lower wall 30a of a four-direction duct 30 extending rearward is disposed, The bumper panel 10 has an upper end which is connected with a body front end 32, on which a front end of a front hood 34 is disposed. The front hood 34 is openable with respect to the body front end 32.

A radiator support 40 is disposed behind the bumper panel 10, and a condenser 42 and a radiator 44 are further disposed behind the radiator support 40. The condenser 42 cools a refrigerant of an air conditioner, and the radiator 44 cools cooling water for the engine. The radiator support 40 has a rectangular frame shape as a whole, and includes a center support 40a near the center in the vehicle width direction, extending along the vehicle height.

The four-direction duct 30 guides air entering through the lower grille opening 12 and the upper grille opening 14 to the radiator 44, and includes walls in four directions. In this example, the lower wall 30a forms a top surface of the lower shock absorber 20.

A duct upper wall 30b of the four-direction duct 30 is disposed behind the bumper panel 10 and above the upper shock absorber 22. The vehicle front structure further includes, on the duct upper wall 30b, a grille stay 50 and also includes a stay cover 52 covering a rear portion of the grille stay 50. The stay cover 52 and the duct upper wall 30b are fastened and secured together with a grille bracket 54 disposed below, and a rear end of the grille bracket 54 is secured to the radiator support 40.

Frame members including the lower bumper reinforcement 24, the upper bumper reinforcement 26, and the radiator support 40, and bodies including the body front end 32 and the front hood 34 may be composed of a steel material, while other members may be composed of resin.

Grille Stay

Figure 2:
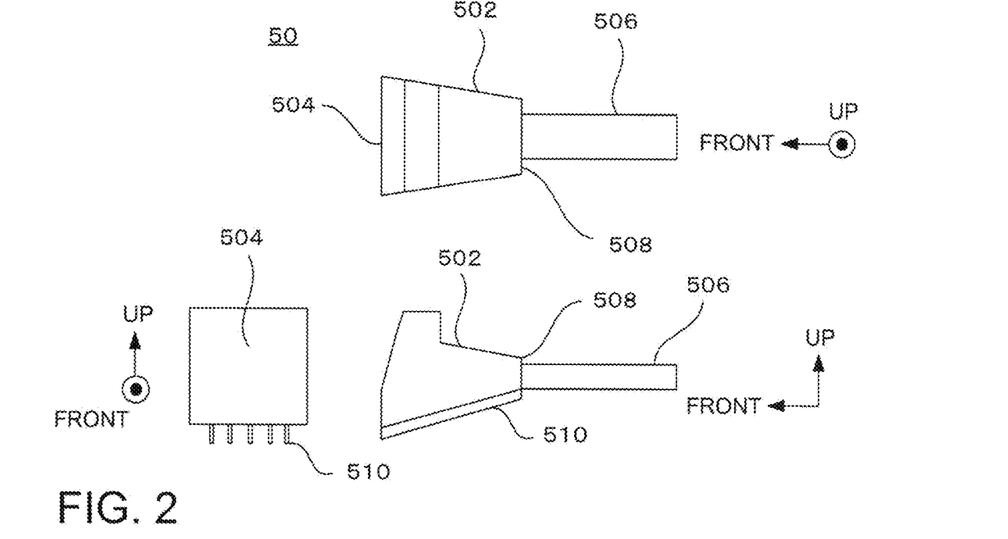
FIG. 2 illustrates a structure of a grille stay.

FIG. 2 illustrates a structure of the grille stay 50. The grille stay 50 includes a front portion 502 having a forwardly increasing cross sectional area, with a front face 504 being positioned along a rear face of the bumper panel 10. The front portion 502 has a box shape having a hollow interior. The grille stay 50 further includes a rear portion 506 having a rectangular parallelepiped shape and having a cross sectional area smaller than that of the front portion 502. Thus, a step portion 508 is formed between the front portion 502 and the rear portion 506. The front portion 502 includes, on its undersurface, a plurality of fins 510 to enhance the strength of the grille stay 50 along the length of the vehicle.

Stay Cover

Figure 3:
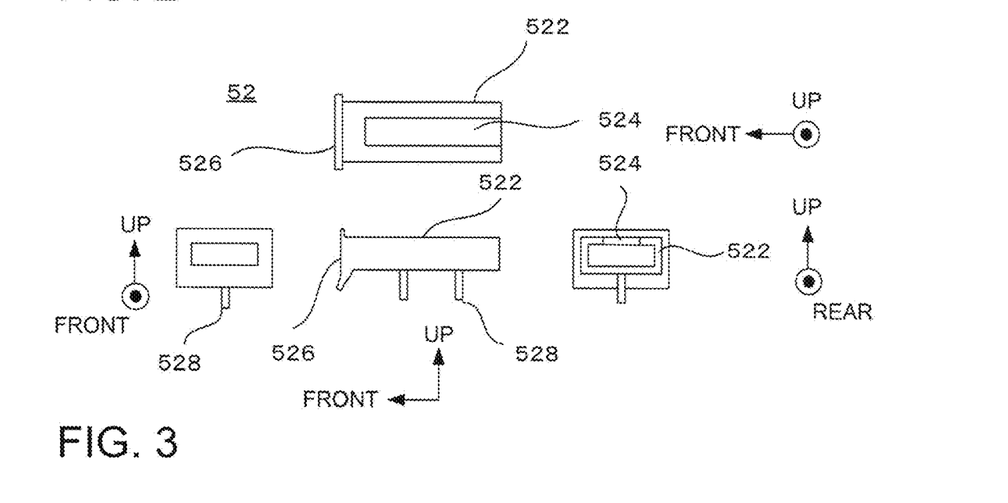
FIG. 3 illustrates a structure of a stay cover.

FIG. 3 illustrates a structure of the stay cover 52. The stay cover 52 includes a cover body 522 having a rectangular tube shape as a whole, and includes, on its top surface, a slit 524 formed from rearward. The stay cover 52 further includes two bolt shafts 528 extending downward from its undersurface. The stay cover 52 also includes, on a front end of the cover body 522, a flange portion 526 expanding toward the peripheral portion. The stay cover 52 may house the rear portion 506 of the grille stay 50 therein, and the front face of the flange portion 526 abuts against the rear face of the step portion 508 of the grille stay 50.

Grille Bracket

Figure 4:
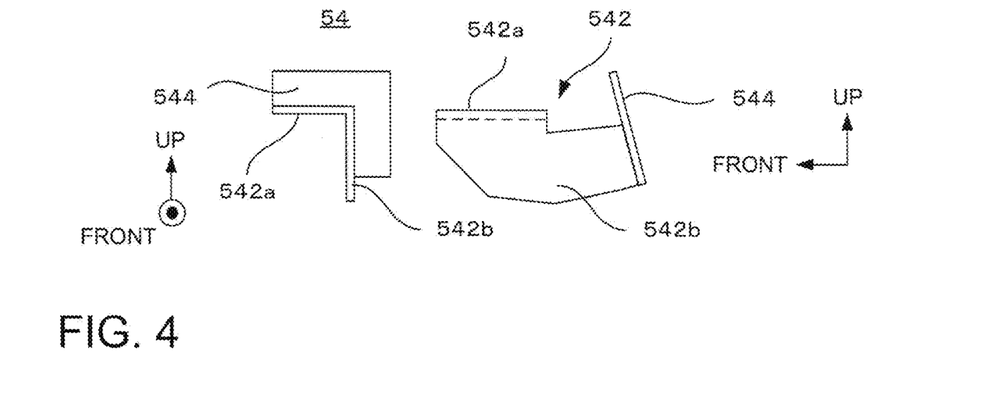
FIG. 4 illustrates a structure of a grille bracket.

FIG. 4 illustrates a structure of the grille bracket 54. The grille bracket 54 includes a bracket body 542 having an inverted and upside-down L shape and including an upper piece 542a and a side piece 542b. The side piece 542b extends further rearward than the upper piece 542a, and a flange portion 544 is disposed on the rear end of the side piece 542b. In this example, the flange portion 544 is formed to extend laterally and upward. The upper piece 542a includes a hole (not shown) through which the bolt shaft 528 of the stay cover 52 passes.

Securing Structure for Grille Stay

Figure 5:
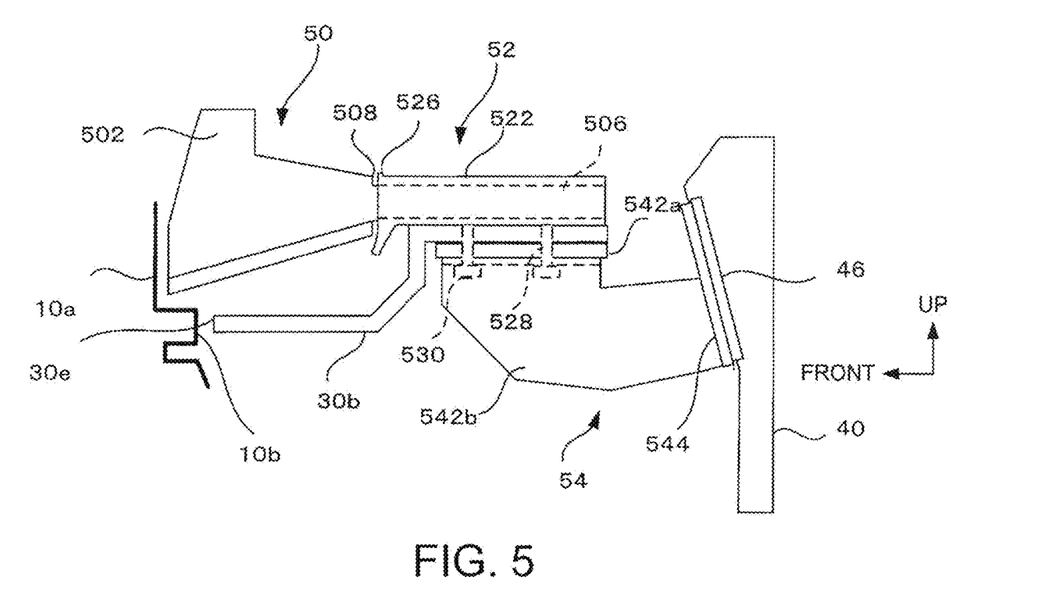
FIG. 5 illustrates a securing structure for the grille stay.

FIG. 5 illustrates a securing structure for the grille stay 50. The rear portion 506 of the grille stay 50 is housed in the cover body 522 of the stay cover 52. The rear face of the step portion 508 of the grille stay 50 laps with the flange portion 526 of the stay cover 52 in the vehicle length direction so that they face each other. The bolt shafts 528 pass through the duct upper wall 30b and the upper piece 542a of the grille bracket 54, and nuts 530 are screwed in the tips of the bolt shafts 528. As such, the stay cover 52 and the grille bracket 54 are fastened and secured together, with the duct upper wall 30b being disposed between them. The flange portion 544 on the rear end of the grille bracket 54 is secured to a bracket 46 extending from the radiator support 40. The other end of the bracket 46 may be secured to the center support 40a of the radiator support 40 or to an upper support 40d extending along the vehicle width.

Figure 6:
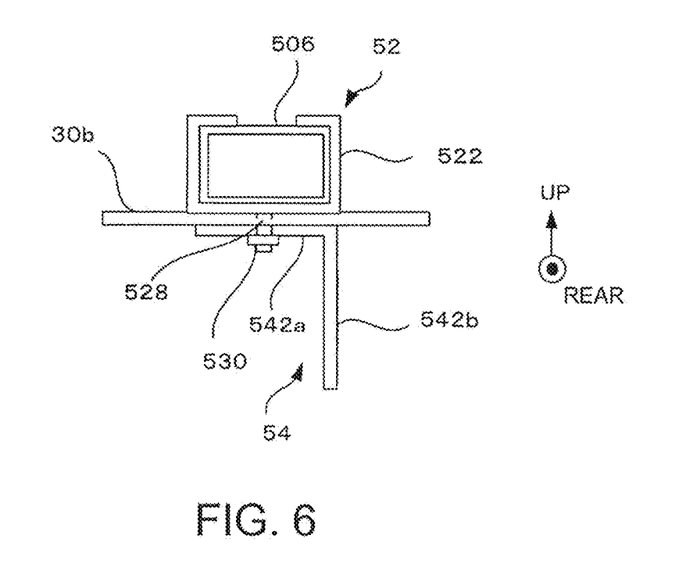
FIG. 6 illustrates a structure of a securing portion for the stay cover and the grille bracket.

FIG. 6 illustrates a structure of a securing portion securing the stay cover 52 and the grille bracket 54. As illustrated, the bolt shaft 528 passes through the duct upper wall 30b and the upper piece 542a of the grille bracket 54, and the nut 530 is screwed in the tip end of the bolt shaft 528.

Further, the duct upper wall 30b has a leading end 30e that faces an abutting surface 10b of a rear protruding portion disposed on a rear surface member 10a on the rear surface of the bumper panel 10. Therefore, when the bumper panel 10 deforms rearward, the leading end 30e of the duct upper wall 30b hits the abutting surface 10b.

Radiator Support and Bumper Reinforcement

Figure 7:
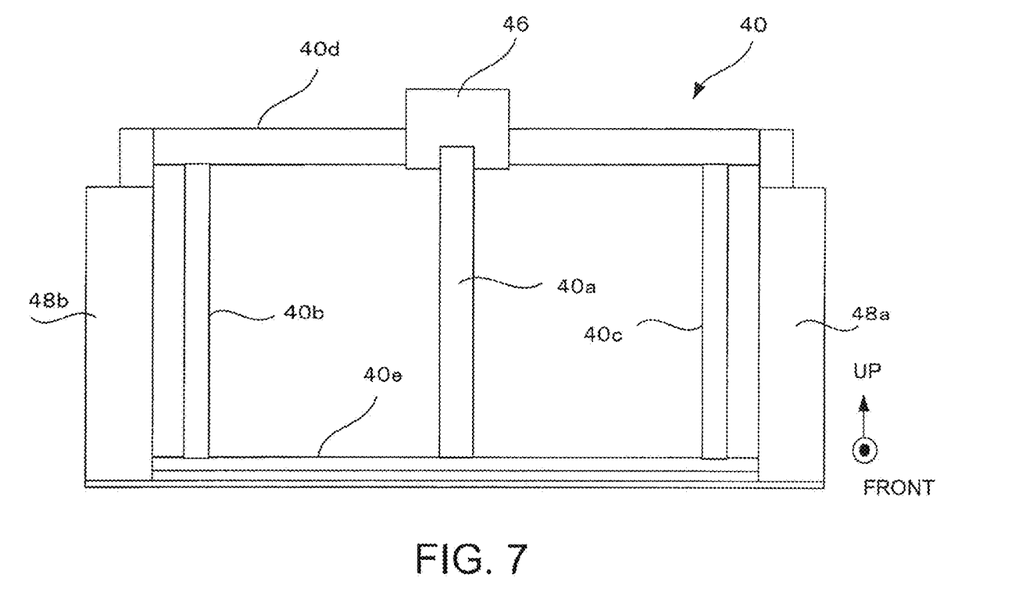
FIG. 7 is a diagram illustrating the radiator support seen from frontward.

FIG. 7 illustrates the radiator support 40 as viewed from forward. As illustrated, the radiator support 40 includes, in addition to the center support 40a extending vertically in the center in the vehicle width direction, the upper support 40d extending in the upper portion along the vehicle width, side supports 40b and 40c extending vertically at the respective sides, and a lower support 40e, to form a rectangular frame shape as a whole. The radiator support 40 further includes, outward of the side supports 40b and 40c, support poles 48a and 48b, respectively, extending vertically to connect opposite ends of the upper support 40d with opposite ends of the lower support 40e. The vertical strength of the radiator support 40 may be obtained by these support poles 48a and 48b; the side supports 40b and 40c may function as members for mounting other components. Front ends of side members, which are vehicle frame members extending from rearward, are attached to the support poles 48a and 48b, respectively, from rearward.

Figure 8:
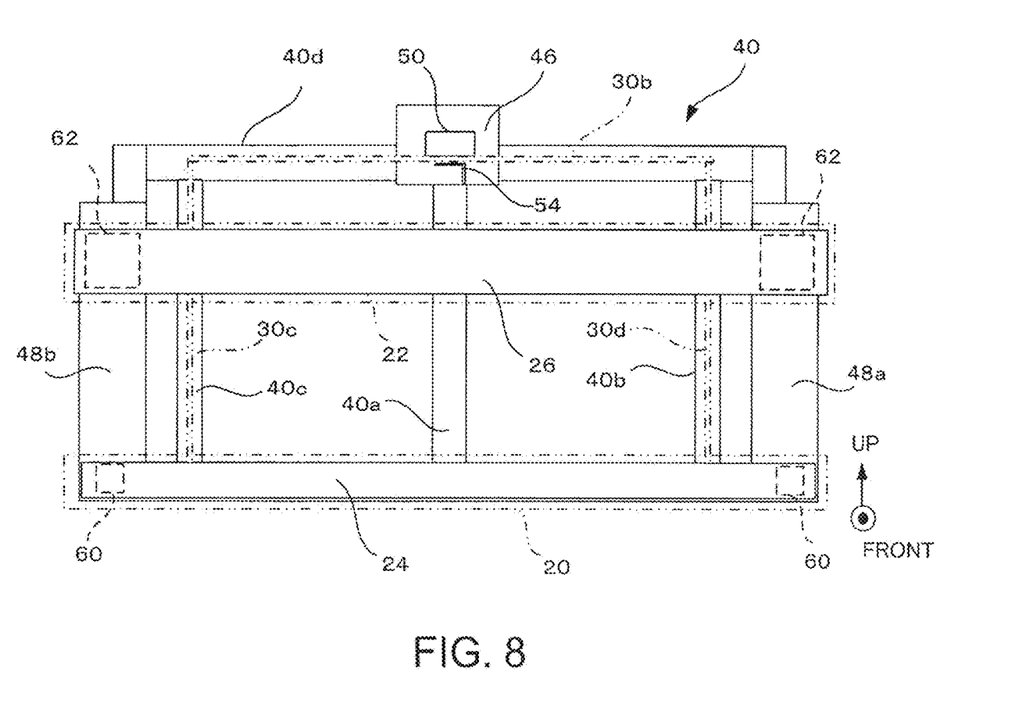
FIG. 8 is a diagram illustrating a lower bumper reinforcement and an upper bumper reinforcement mounted before the radiator support.

FIG. 8 illustrates the radiator support 40 with the lower bumper reinforcement 24 and the upper bumper reinforcement 26 attached on its front portion. As illustrated, support members 60 extending forward are disposed on the lower parts of the pole 48a and 48b, respectively, with opposite ends of the lower bumper reinforcement 24 being secured to the leading ends of the support members 60, respectively. Support members 62 extending forward are further disposed on the upper parts of the support poles 48a and 48b, respectively, with opposite ends of the upper bumper reinforcement 26 being secured to the leading ends of the support members 62, respectively.

The lower shock absorber 20 is disposed to cover the front face of the lower bumper reinforcement 24, and the upper shock absorber 22 is disposed to cover the front face of the upper bumper reinforcement 26.

Further, the duct upper wall 30b and side walls 30c and 30d are disposed in front of the upper support 40d and the side supports 40b and 40c of the radiator support 40, respectively.

Figure 9:
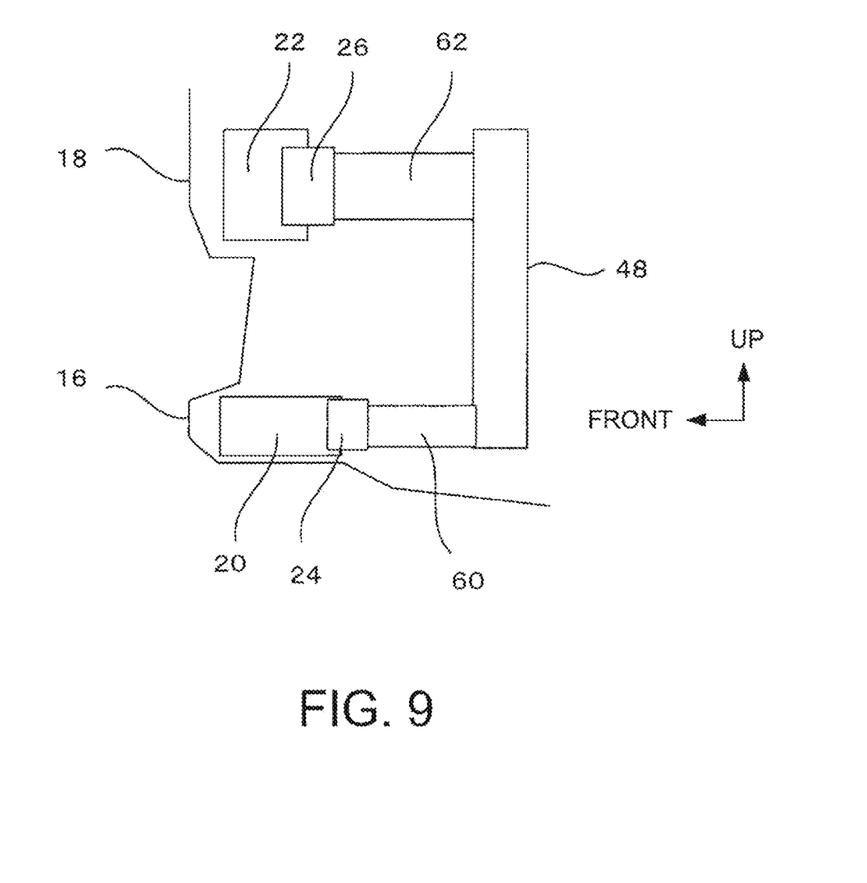
FIG. 9 is a diagram illustrating a support pole, the lower bumper reinforcement, and the upper bumper reinforcement, mounted on the radiator support.

FIG. 9 illustrates a state where the support pole 48, and the lower bumper reinforcement 24 and the upper bumper reinforcement 26 are mounted. As illustrated, the support members 60 and 62 are disposed in front of the support pole 48, the lower bumper reinforcement 24 and the upper bumper reinforcement 26 are attached to the respective leading ends of the support members 60 and 62, and the lower shock absorber 20 and the upper shock absorber 22 are disposed in front of the lower bumper reinforcement 24 and the upper bumper reinforcement 26.

Bumper Panel

Figure 10:
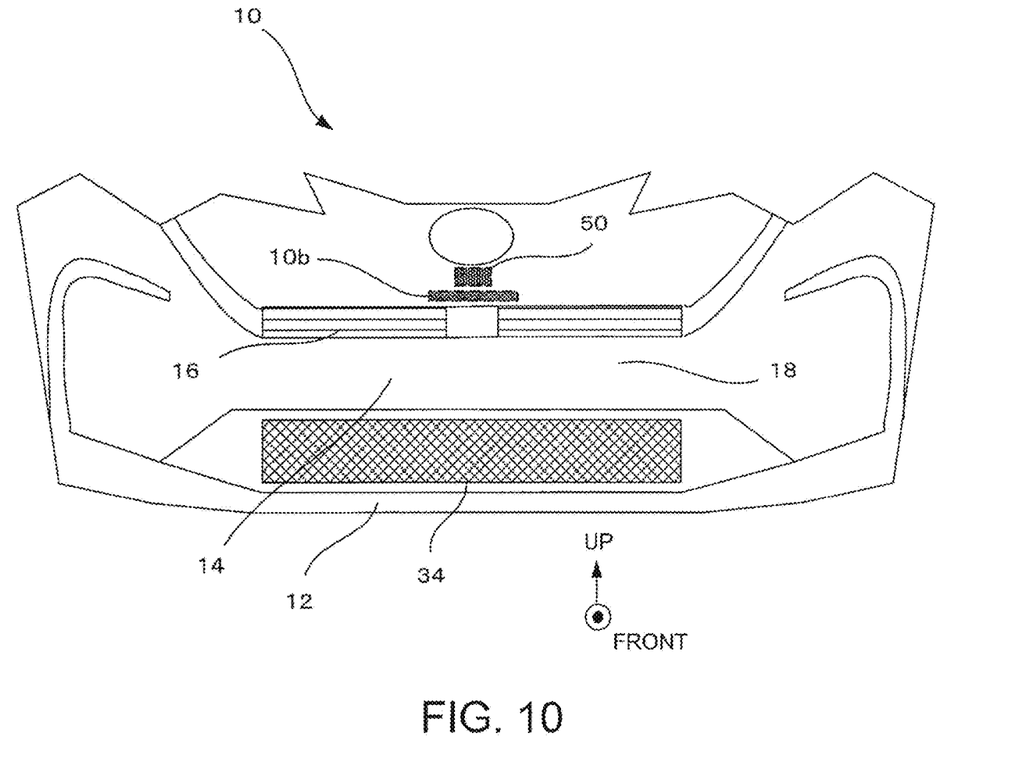
FIG. 10 illustrates a bumper panel seen from forward.

FIG. 10 illustrates the bumper panel 10 as viewed from frontward. The bumper panel 10 is a rectangular panel extending along the vehicle width as a whole, with opposite side portions and an upper portion extending rearward. The grille stay 50 is located on the rear surface of the bumper panel 10 near its center top portion, and the abutting surface 10b is located below the grille stay 50. FIG. 10 schematically shows these members.

Deformation on Impact

Figure 11:
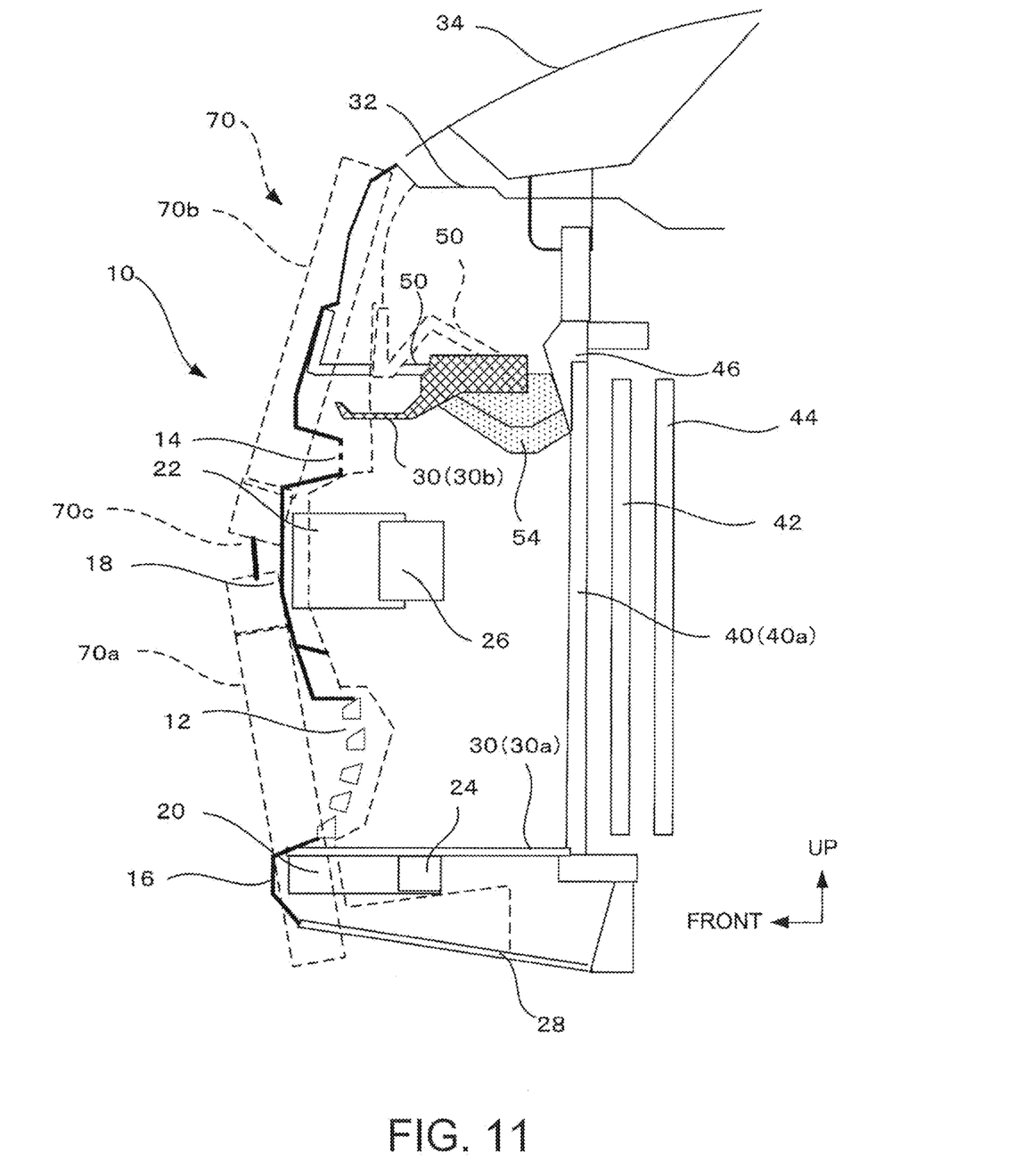
FIG. 11 illustrates a comparative example structure including a grille stay in a plate shape with the stay cover and the abutting surface being omitted.

FIG. 11 illustrates deformation of the vehicle front portion and a leg 70 upon impact in a dashed line. The pedestrian's leg 70 includes a shin portion 70a and a thigh portion 70b with a ligament 70c located at a knee portion. When the vehicle front portion collides with the leg 70, the lower shock absorber 20 and the upper shock absorber 22 of the vehicle front portion resist the impact.

In the present embodiment, the grille stay 50 having a box shape is disposed above the upper shock absorber 22 on the rear side of the bumper panel 10. Therefore, when the upper portion of the bumper panel 10 moves rearward, the rear surface of the bumper panel 10 hits the grille stay 50. At the back of the grille stay 50, the stay cover 52 is secured to the radiator support 40 by the grille bracket 54. The stay cover 52 includes a front end facing the rear face of the step portion of the grille stay 50. Thus, when the grille stay 50 attempts to move rearward, the stay cover 52 resists the movement to thereby enable the grille stay 50 to resist the rearward movement of the bumper panel 10.

The duct upper wall 30b is further secured to the radiator support 40 by the grille bracket 54. Therefore, when the bumper panel 10 attempts to move rearward, the abutting surface 10b hits the leading end 30e of the duct upper wall 30b to thereby reduce the amount of rearward movement of the bumper panel 10.

The under cover 28 is temporarily bent downward toward the rear portion, and is thereafter bent upward. This upward bent portion serves as a ridge 28a extending along the vehicle width. Therefore, when the lower bumper 16 moves rearward, the under cover 28 bends upward about the ridge 28a in a region before the ridge 28a to form an upward convex. The lower bumper reinforcement 24 is located at a position corresponding to an apex of the upward convex, to thereby reduce further bending of the under cover 28 and increase the force that resists the rearward movement of the lower bumper 16. The ridge portion 28a may be reinforced to assist the deformation about the ridge 28a.

FIG. 11 illustrates a comparative example structure including a grille stay 50 having a plate shape, with the stay cover 52 and the abutting surface 10b being omitted. FIG. 11 also shows a shape of the leg 70 after deformation in a dashed line.

This structure provides only a small force that supports the bumper panel 10 in the portion above the upper bumper 18, and also provides a small resisting force against separation between the thigh portion 70b and the shin portion 70a. Specifically, the fastening portion of the grille stay 50 breaks or bends upward, so that the bumper panel 10 moves significantly rearward. Further, as the under cover 28, which is bent upward, has no obstacles above, an amount of rearward movement is increased in the lower portion of the bumper panel. Thus, the force in the direction of expanding the pedestrian's ligament 70c increases.

As the vehicle according to the present embodiment includes a front face extending approximately in the vertical direction and having a great height, the front face of the vehicle hits the whole leg 70 upon impact. The front face cannot therefore provide rotation to cause the pedestrian's leg 70 to move forward and upward. The bumper panel 10 may have a certain degree of resisting force in the upper portion to suppress rearward intrusion of the thigh portion 70b and thereby reduce a tensile force for the ligament 70c.

The invention claimed is:

1. A vehicle front structure comprising:
   a grille stay located behind a bumper panel having a grille opening, the grill stay facing an upper portion of the bumper panel from behind, and
   a stay cover disposed to cover a rear portion of the grille stay, wherein
   the grille stay comprises a front portion and a rear portion, the rear portion having a smaller cross sectional area than the front portion,
   the grill stay further comprises a step portion at a boundary between the front portion and the rear portion, and
   the stay cover includes a front end that is disposed to face a rear face of the step portion, wherein a front-most portion of the stay cover is rearward of a junction between the front portion and the rear portion.

2. A vehicle front structure comprising:
   a grille stay located behind a bumper panel having a grille opening, the grill stay facing an upper portion of the bumper panel from behind, and
   a stay cover disposed to cover a rear portion of the grille stay, wherein
   the grille stay comprises a front portion and a rear portion, the rear portion having a smaller cross sectional area than the front portion,
   the grill stay further comprises a step portion at a boundary between the front portion and the rear portion, and
   the stay cover includes a front end that is disposed to face a rear face of the step portion, wherein
   a radiator support is disposed behind the bumper panel, and a duct upper wall extends from an upper portion of the radiator support toward the bumper panel above the grille opening, the duct upper wall having a front end facing an abutting surface extending rearward on a rear surface of the bumper panel.

3. The vehicle front structure according to claim 2, wherein
   the stay cover is secured to the radiator support via a grille bracket and,
   the stay cover, the duct upper wall, and the grille bracket are fastened and secured together.

4. The vehicle front structure according to claim 1, wherein
   the grille stay has a box shape.

5. The vehicle front structure according to claim 2, wherein
   the grille stay has a box shape.

6. The vehicle front structure according to claim 3, wherein
   the grille stay has a box shape.

7. The vehicle front structure according to claim 1, wherein the grille stay further comprises a plurality of fins on a bottom surface.

8. The vehicle front structure according to claim 7, wherein the plurality of fins is on the front portion of the grille stay.

9. The vehicle front structure according to claim 7, wherein each of the plurality of fins extends rearward from a front-most surface of the grille stay.

10. The vehicle front structure according to claim 1, wherein the stay cover further comprises a slit.

11. The vehicle front structure according to claim 10, wherein the stay cover further comprises a bolt shaft extending from a bottom surface of the stay cover.

12. The vehicle front structure according to claim 11, wherein the slit is above the bolt shaft.

13. The vehicle front structure according to claim 2, wherein the grille stay further comprises a plurality of fins on a bottom surface.

14. The vehicle front structure according to claim 13, wherein the plurality of fins is on the front portion of the grille stay.

15. The vehicle front structure according to claim 13, wherein each of the plurality of fins extends rearward from a front-most surface of the grille stay.

16. The vehicle front structure according to claim 2, wherein a front-most portion of the stay cover is rearward of a junction between the front portion and the rear portion.

17. The vehicle front structure according to claim 2, wherein the stay cover further comprises a slit.

18. The vehicle front structure according to claim 17, wherein the stay cover further comprises a bolt shaft extending from a bottom surface of the stay cover.

19. The vehicle front structure according to claim 18, wherein the slit is above the bolt shaft.

20. A vehicle front structure comprising:
a grille stay located behind a bumper panel having a grille opening, the grill stay facing an upper portion of the bumper panel from behind, and
a stay cover disposed to cover a rear portion of the grille stay, wherein
the grille stay comprises a front portion and a rear portion, the rear portion having a smaller cross sectional area than the front portion,
the grill stay further comprises a step portion at a boundary between the front portion and the rear portion, and
the stay cover includes a front end that is disposed to face a rear face of the step portion, wherein the grille stay further comprises a plurality of fins on a bottom surface.

\* \* \* \* \*